April 24, 1951        H. J. GRAHAM        2,549,804

WELDING BOOT

Filed Nov. 1, 1949

Inventor
Harold J. Graham
by Roberts, Cushman & Groves
Att'ys

Patented Apr. 24, 1951

2,549,804

UNITED STATES PATENT OFFICE 2,549,804

WELDING BOOT

Harold J. Graham, Highland Park, Mich., assignor to Graham Manufacturing Corporation, Detroit, Mich., a corporation of Michigan Application November 1, 1949, Serial No. 124,901

8 Claims. (Cl. 219—4)

This invention relates to welding apparatus and has for one of its main objects the isolation of an area at which welding takes place, from the surrounding atmosphere. Other objects are to provide such isolation, in order to protect the welding area from the atmosphere as well as to protect the environment from spattering, in a manner particularly suited for use with welding heads of the general type disclosed in my copending application Serial No. 81,130 although it can be advantageously used with other apparatus, to provide such an isolating arrangement that is well suited for welding stud-shaped workpieces, held in the chuck of a percussion welding head, to a comparatively extended surface of a second workpiece, and generally to advance the art of end or stud welding.

The invention contemplates, in one of its aspects, the attachment to the chuck or stud holder of a welding head, of a boot made from yieldable material for example synthetic rubber. This boot or sleeve is at one end fastened to the chuck, surrounds and extends beyond the end of the stud or similar workpiece held in the chuck, and has at the outer end an aperture large enough to pass the outer end of the stud. In accordance with the invention this aperture is preferably, although not necessarily, circular with a diameter greater than the diameter of the stud but smaller than the inside diameter of the boot wall thereby to form an inwardly turned lip at the outer end of the boot. In order to attach the other end of the boot to the chuck they may be provided with corresponding sealing edges, for example the boot having an internal groove shaped for engaging an external projection or lip upon the chuck. If necessary the wall thickness of the boot is increased at that point so that the groove does not unduly weaken the boot structure. As the chuck is moved during the welding operation, the apertured end of the boot comes into contact with the large workpiece forcing the lip against it to seal the boot interior from the outside atmosphere. Further movement of the chuck collapses the boot thus permitting the stud to pass into the aperture into welding contact with the workpiece. The molten metal formed by the welding operation combines with the oxygen in the air trapped in the boot, but the exclusion of additional oxygen limits the quantity of oxides formed to a small amount thereby resulting in a better weld. The boot also prevents the spattering of molten weld metal upon the operator and adjacent equipment. The lip provides an enlarged sealing area and also increases the friction between boot and workpiece thereby securely preventing slippage.

In another respect, the invention offers the possibility of further reducing the amount of oxide formed, by forming the weld in an inert gas such as argon or helium. Means may be provided which are synchronized with the movement of the chuck to introduce simultaneously with the chuck movement a supply of such inert gas into the interior of the boot. Such means may include a passage through the chuck connected with the gas supply by means of a control valve. The valve may be operated mechanically by the chuck movement through a suitable linkage or by a solenoid connected in the welding apparatus control circuit.

These and other objects and aspects will be apparent from the following description of an illustrative specific embodiment of the invention referring to a drawing in which Fig. 1 is a side elevation view of the device attached to a welding gun chuck in its retracted position;

Figure 3:
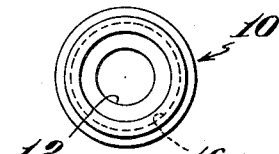
Fig. 3 is a plan view of the device.
Figure 1:
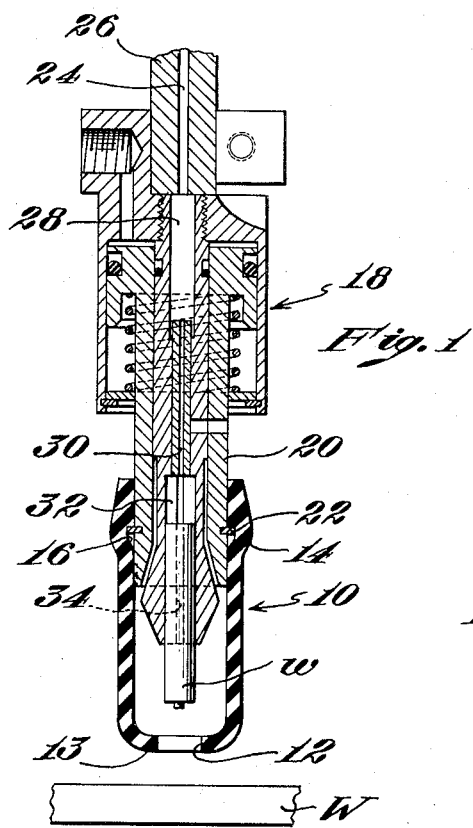
Figure 4:
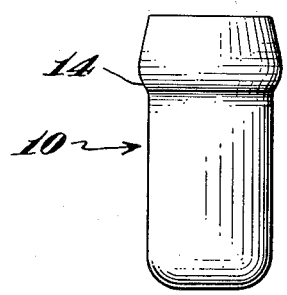
Fig. 4 is an elevational view of the device.

In the particular embodiment of the invention chosen for the purpose of illustration, a boot 10 is shown in Fig. 1 positioned circumjacent a stud $w$ which may be of the type described in detail in my copending application Serial No. 43,498, now Patent #2,518,463, issued August 15, 1950. As is best shown in Fig. 1, the boot 10 comprises a hollow essentially cylindrical sleeve of yieldable insulating material such as Neoprene, which is capable of standing abrasion, ozone, and relatively high temperatures. The bottom end of the boot 10 is closed except for a centrally located circular aperture 12 which has a diameter greater than the diameter of the stud $w$ thereby to form a lip 13 which can be shaped as an inwardly projecting flange. The wall of the upper end of the boot 10 is increased in thickness as at 14 so that the strength of the wall is not decreased by an internal circumferential groove 16 whose function is described in detail below.

The boot 10 is shown in Fig. 1 attached to a chuck 8 of a welding gun similar in construction to the chuck shown in Fig. 6 of my copending application Serial No. 81,130 although it is to be understood that the use of such boot is not limited to any particular type of chuck. The internal diameter of the upper end of the boot 10 is made slightly less than the collet portion 20 of the chuck 18 so that the boot is stretched when it is slipped over the collet portion so that a gas-tight seal is formed therebetween. To insure that separation of the boot 10 from the chuck 18 does not occur during welding, the groove 16 engages a lip 22 provided upon the collet 20. In the particular chuck 18 illustrated, the lip is a snap ring secured in a groove cut in the outside of the collet 20 although it is to be understood that the lip may be formed integrally with the collet or attached by any conventional means to other portions of the chuck without departing from the spirit of the invention.

Figure 2:
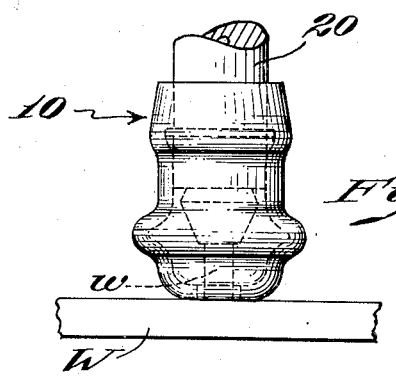
Fig. 2 is a side elevation view of the device when the chuck to which it is attached is in the welding position.

During the welding operation the chuck 18 and the stud w held therein move downwardly from the retracted position shown in Fig. 1 towards a large workpiece W to which the stud is to be welded whereby the lip 13 at the apertured end of the boot 10 is forced into contact with the workpiece W thereby to form an essentially gas-tight seal isolating the interior of the boot from the outside atmosphere. The completion of the downward stroke of the chuck 20 collapses the boot 10 as is shown in Fig. 2 so that the stud w passes through aperture 12 to contact the workpiece W. As is described in detail in my co-pending application, Serial No. 43,498, such contact completes a welding circuit to weld the stud w to the workpiece W. Because of the sealing action of the lip 13 of the boot 10 against the workpiece W, the amount of oxygen available to combine with the molten metal is limited so that the quantity of weld-weakening oxides formed is reduced. The boot 10 also prevents splattering of molten weld metal upon the operator and adjacent equipment.

If because of the materials being welded, it is necessary to eliminate insofar as possible all oxides, the welding may be carried out in an inert atmosphere by introducing a gas, such as argon or carbon tetrachloride, into the interior of the boot 10. For example such gas may be introduced through a passageway 24 in the rod 26 supporting the chuck 18, thence through passageways 28 and 30 into the recess 32 for the stud w. From the recess 32 the gas by-passes the stud w into the boot 10 through the slots 34 which separate the chuck jaws. The flow of gas is controlled by means of a conventional valve (not shown). The valve is either cracked to allow a small continuous flow of gas into the interior of the boot 10 or may be operated in synchronism with the movement of the chuck 18 opening to provide a pulse of gas during the downward chuck stroke. The latter operation may be controlled mechanically by the chuck 18 through a suitable linkage, or pneumatically, or electrically by means of a solenoid connected in the electrical control system of the welding gun.

It should be understood that the present disclosure is for the purpose of illustration only and that this invention includes all modifications and equivalents which fall within the scope of the appended claims.

I claim:

1. For use with welding apparatus having a chuck for holding a stud to be welded to a workpiece, a device for isolating the area in which the welding takes place from the surrounding atmosphere comprising a cylindrical boot of yieldable material positioned circumjacent the stud and having a circular aperture in one end thereof having a diameter greater than the diameter of the stud and lesser than the diameter of the boot thereby to form a lip, and means for attaching the opposite end of the boot to the chuck so that movement of the chuck forces the lip of the boot into contact with the workpiece to seal the interior of the boot from outside atmosphere, further movement of the chuck collapsing the boot thus permitting the stud to pass through the aperture into welding contact with the workpiece.

2. For use with welding apparatus having a chuck for holding a stud to be welded to a workpiece, a device for isolating the area in which the welding takes place from the surrounding atmosphere comprising a boot of yieldable material positioned circumjacent the stud and having an aperture in one end thereof, the wall of the opposite end of the boot being thicker and having an internal groove adapted to engage a lip upon the chuck thereby to attach the boot to the chuck so that movement of the chuck forces the apertured end of the boot into contact with the workpiece to seal the interior of the boot from outside atmosphere, further movement of the chuck collapsing the boot thus permitting the stud to pass through the aperture into welding contact with the workpiece.

3. For use with welding apparatus having a chuck for holding a stud to be welded to a workpiece, a device for isolating the area in which the welding takes place from the surrounding atmosphere comprising a cylindrical boot of yieldable material positioned circumjacent the stud and having a circular aperture in one end thereof having a diameter greater than the diameter of the stud and lesser than the diameter of the boot thereby to form a flange, the wall of the opposite end of the boot being thicker and having an internal groove adapted to engage a lip upon the chuck thereby to attach the boot to the chuck so that movement of the chuck forces the flange of the boot into contact with the workpiece to seal the interior of the boot from outside atmosphere, further movement of the chuck collapsing the boot thus permitting the stud to pass through the aperture into welding contact with the workpiece.

4. For use with welding apparatus having a chuck for holding a stud to be welded to a workpiece, a device for isolating the area in which the welding takes place from the surrounding atmosphere comprising a boot of yieldable material positioned circumjacent the stud and having an aperture in one end thereof, means for attaching the opposite end of the boot to the chuck so that movement of the chuck forces the apertured end of the boot into contact with the workpiece to seal the interior of the boot from outside atmosphere, and means for introducing an inert gas into the interior of the boot, further movement of the chuck collapsing the boot thus permitting the stud to pass through the aperture into welding contact with the workpiece.

5. For use with welding apparatus having a chuck for holding a stud to be welded to a workpiece, a device for isolating the area in which the welding takes place from the surrounding atmosphere comprising a boot of yieldable material positioned circumjacent the stud and having an aperture in one end thereof, means for attaching the opposite end of the boot to the chuck so that movement of the chuck forces the apertured end of the boot into contact with the workpiece to seal the interior of the boot from outside atmosphere, and means including a passageway through said chuck for introducing an inert gas into the interior of the boot, further movement of the chuck collapsing the boot thus permitting the stud to pass through the aperture into welding contact with the workpiece.

6. An isolating device for a welding head having a chuck for a stud to be welded to a work piece, comprising a chuck sleeve for holding the stud and arranged for reciprocation between two positions one with the end of the stud at a maximum distance from the work piece and the other with the stud end contacting the work piece, and a boot fitting said sleeve, said boot projecting from the sleeve to surround, and normally to extend with its walls beyond said stud to a distance intermediate said stud end positions and having a central aperture at its extending end, said walls being collapsible to yield to decreasing distances as the sleeve approaches said contacting position, and said aperture having a continuous yieldable lip to seal the interior of the boot against the work piece during said contacting, whereby the boot isolates the welding area between stud and work piece upon said contacting and exposes the work piece and the stud end welded thereto upon withdrawal of the chuck.

7. Device according to claim 6, wherein the chuck sleeve has an outer sealing edge and the sleeve fitting end of the boot has an inner sealing edge corresponding to the sleeve edge.

8. Device according to claim 6 wherein said lip of the boot has a flange which projects transversely to increase the sealing surface between boot and work piece.

HAROLD J. GRAHAM.

REFERENCES CITED

The following references are of record in the file of this patent:

UNITED STATES PATENTS

| Number | Name | Date |
| --- | --- | --- |
| 1,552,369 | White | Sept. 1, 1925 |
| 2,194,573 | Schulz | Mar. 26, 1940 |
| 2,315,502 | Crecca et al. | Apr. 6, 1943 |